United States Patent [19]

Kelm

[11] Patent Number: 4,993,889

[45] Date of Patent: Feb. 19, 1991

[54] BROACHING ASSEMBLY

[75] Inventor: Walter Kelm, Mt. Clemens, Mich.

[73] Assignee: Carboloy Inc., Warren, Mich.

[21] Appl. No.: 392,260

[22] Filed: Aug. 10, 1989

[51] Int. Cl.$^5$ .............................................. B23P 15/42
[52] U.S. Cl. ........................................ 407/15; 407/41;
407/49; 407/94; 407/13
[58] Field of Search ................... 407/15, 17, 18, 19,
407/13, 41, 49, 94, 106, 108

[56] References Cited
U.S. PATENT DOCUMENTS 2,585,832  2/1952  Phaneuf ................................ 407/18
4,243,347  1/1981  Clapp et al. ......................... 407/15

Primary Examiner—Frederick R. Schmidt
Assistant Examiner—Lawrence Cruz
Attorney, Agent, or Firm—Burns, Doane, Swecker & Mathis

[57] ABSTRACT

A broach assembly including a holder having an elongated slot for housing at least one cutting insert and semicircular wedges having a pair of cutting insert engaging faces which are adapted to secure the cutting inserts in the slot and to prevent misalignment and uneven wear.

13 Claims, 4 Drawing Sheets

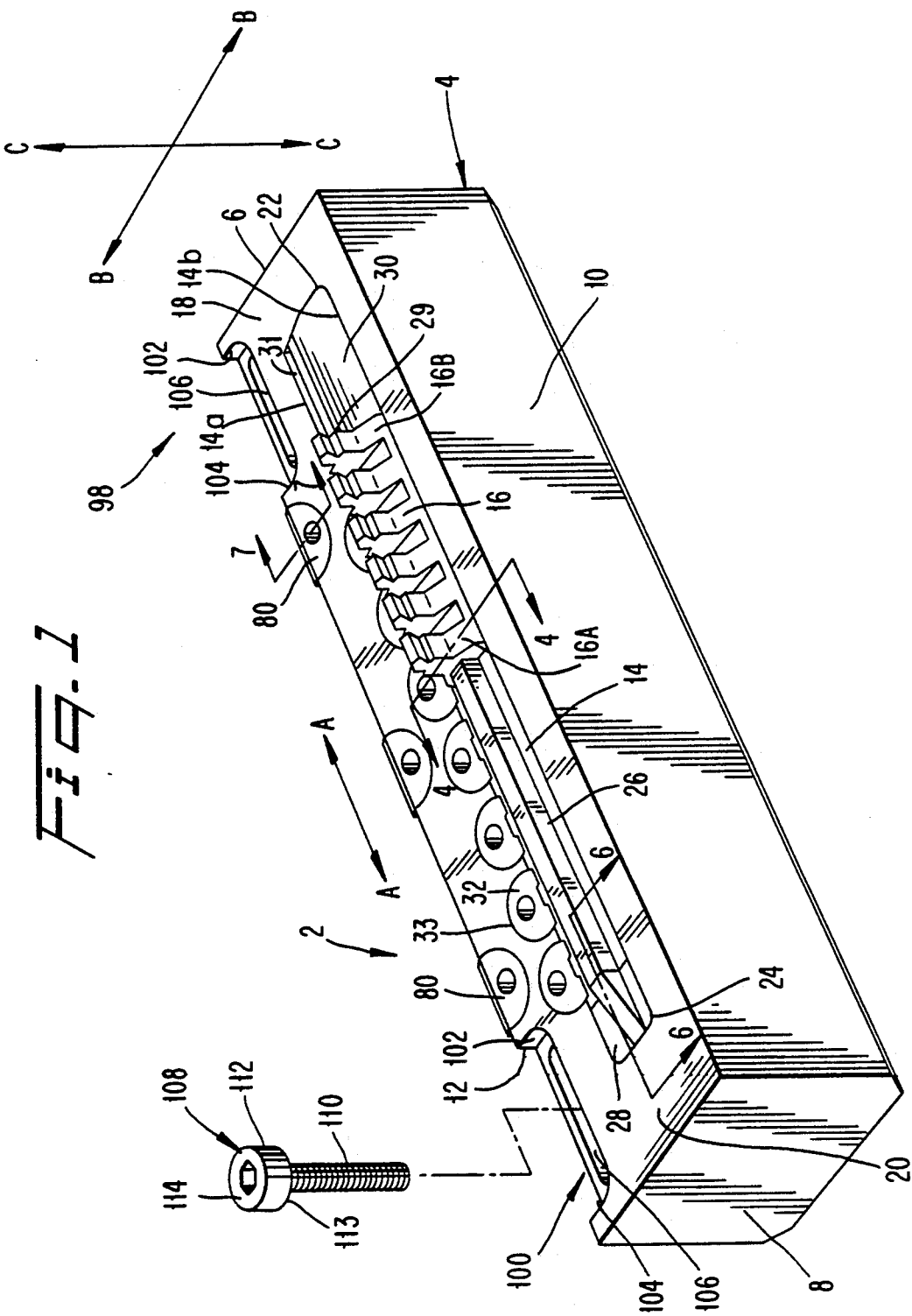

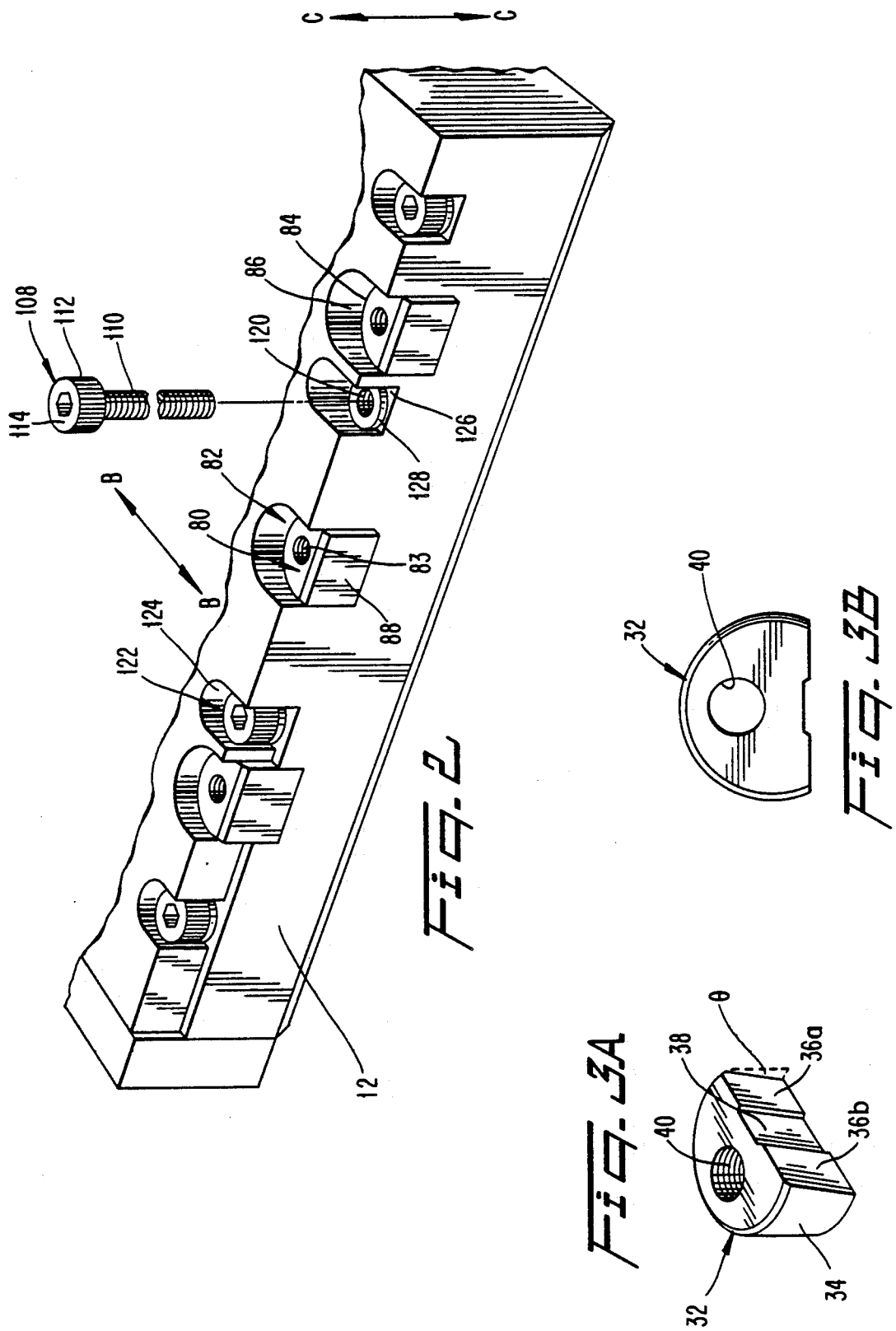

BROACHING ASSEMBLY

FIELD OF THE INVENTION

The present invention is directed to a broaching assembly used for machining finished slots with a single pass and particularly to a broaching assembly employing circular wedges to effectively clamp cutting inserts within a broaching machine.

BACKGROUND OF THE INVENTION

Broaching tools are well known. They are used for machining metal and particularly for forming slots in turbine wheel discs and the like. One such broaching assembly is disclosed in Keith A. Clapp et al., U.S. Pat. No. 4,243,347.

The broach assembly generally includes a plurality of disposable inserts precisely positioned within an elongated slot and clamped therein by means of side and front clamps. The contact surface of the side clamp forces the inserts against the side and bottom locating surfaces of the broaching tool. The front clamp is employed to force the cutting inserts longitudinally against corresponding stops.

Cutting inserts and the slots in which they are housed are machined within acceptable manufacturing tolerances. Accordingly, a gap may exist between one or more of the clamping surfaces and the clamping walls.

A gap between the cutting insert and corresponding clamping wall is detrimental because the cutting insert is subject to movement within the gap. If a cutting insert moves within the gap it can become misaligned. This can cause the cutting insert to fracture and/or wear unevenly. Since the quality of the overall tool is only as good as the worst cutting insert, the existence of a single damaged cutting insert may result in considerable downtime in replacing the damaged cutting insert or may even make it necessary to discard the entire broaching tool.

To overcome this problem, Clapp et al. employs a generally rectangular shim member disposed between the clamping surface and the cutting insert wall. The shim is formed of a soft metal such as brass or copper. The softness of the metal allows the shim to compensate for different sized gaps so that each cutting insert is placed flush against the corresponding clamping surface.

The use of soft metal shims, however, does not adequately solve the problem of cutting insert movement, which occurs for example, when the tool is subjected to unbalanced side loads. This is because the shim deforms when stressed and a gap can form betweeen the shim and the clamping surface and/or the cutting insert.

It is therefore an object of the present invention to provide a broach assembly in which the cutting inserts are uniformly clamped within the broach holder.

It is another object of the invention to provide a clamping system using circular wedges which are rotatable so that the clamping surfaces are aligned flush against respective cutting inserts and which prevents the formation of undesirable gaps.

SUMMARY OF THE INVENTION

The present invention is directed to a broaching assembly comprising a broach holder having an elongated slot for housing therein at least one, and typical several, cutting inserts arranged in a row. The broach holder also includes at least one semi-circular slot positioned along the elongated slot.

The semicircular slot has a opening common with the elongated slot enabling a wedge means, secured within the semicircular slot, to engage and secure the cutting inserts within the elongated slot. More specifically, each semicircular slot houses a semi-circular wedge having a pair of spaced-apart cutting insert engaging faces. Each face is adapted to engage a separate cutting insert. When the wedge is placed loosely within the semi-circular slot it can pivot about its axis so that each of the two cutting insert engaging faces can be orientated flush against the corresponding faces of the respective cutting inserts. When the wedge is secured within the slot the wedge faces exert a camming force against the corresponding face of each cutting insert to thereby lock each cutting insert within the elongated slot and prevent the formation of gaps.

The elongated slot has a pair of opposed ends each of which reside within the holder. One of the ends may be provided with a shock absorbing means to absorb thrust loads on the cutting inserts during machining operations. The other end may be provided with means for adjusting the length of the elongated slot which contains the cutting inserts so that a slot having a fixed length may be used to house varying numbers of cutting inserts.

In another aspect of the invention, the broach holder is provided with a plurality of spaced-apart wedges which are adapted to wedgingly secure the broach holder within a broaching machine. These wedges may be of the same type used to secure the cutting inserts within the elongated slots, although they may have only a single face for engaging the broaching machine. The wedges may be positioned within semicircular slots having an opening facing the broaching machine.

In another feature of the invention means are provided for securing the broach holder within the broaching machine. In one embodiment, a cavity is provided at opposed ends of the broach holder. Each cavity has an elongated, longitudinal slot therein for receiving a screw or bolt. The tail of the screw is movable within the cavity to a position such that the underside of the head of the screw seats on the shoulder of the cavity in the broach holder while the tail extends through the broach holder into a corresponding hole of the broaching machine. In another embodiment, the broach holder may be provided with spaced apart fixed axial holes instead of elongated slots for receiving the screw. It is also within the scope of the disclosure to employ a combination of elongated slots and fixed axial holes.

BRIEF DESCRIPTION OF THE DRAWINGS

The following drawings in which like reference characters indicate like parts are illustrative of embodiments of the invention and are not intended to limit the invention as encompassed by the claims forming part of the application.

FIG. 1 is a perspective view of an embodiment of a broach assembly in accordance with the present invention;

FIG. 2 is a partial perspective view of another embodiment using spaced apart axial holes for securing the broach holder within the broaching machine.

FIG. 3A is a perspective view of a wedge used to secure the cutting inserts within the broach holder;

FIG. 3B is a plan view of the wedge shown in FIG. 3A;

DETAILED DESCRIPTION OF THE INVENTION

Figure 4:
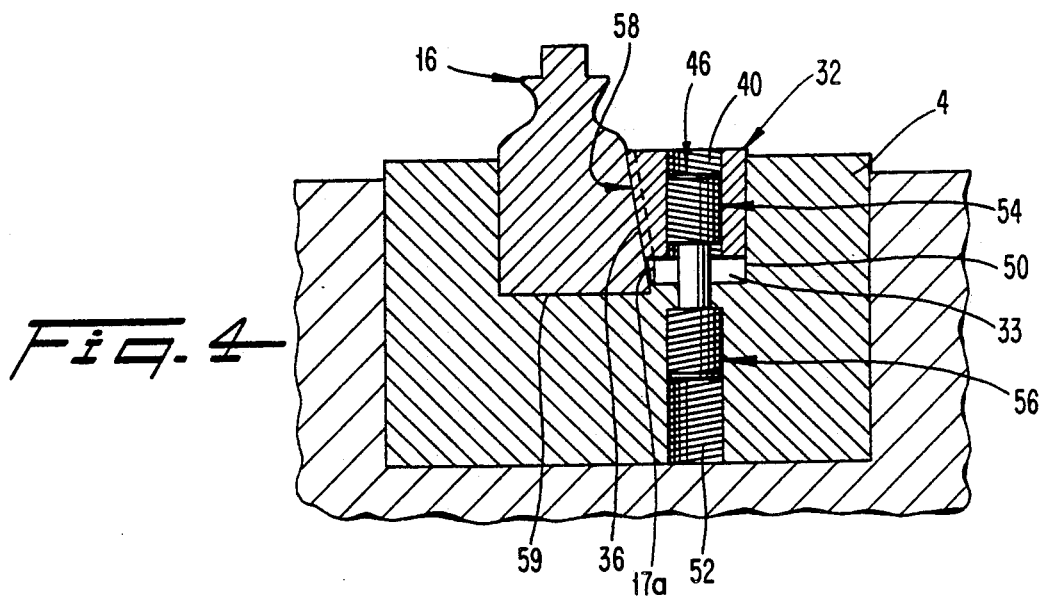
FIG. 4 is a cross-sectional view taken along line 4—4 of FIG. 1.

Referring to FIG. 1, there is disclosed generally a broaching assembly 2 including a broach holder 4 having external end walls 6 and 8 and external side walls 10 and 12. Between the end walls 6 and 8, there is a longitudinally elongated slot 14 for housing therein cutting inserts 16 of the broach assembly 2. The slot 14 includes laterally spaced, longitudinally extending side walls 14a, 14b.

The slot 14 is contained within the broach holder 4 and is separated from the end walls 6 and 8 by holder portions 18 and 20, respectively such that the longitudinally spaced rear and front ends 22 and 24 of the slot 14 are separated from the end walls 6 and 8. This arrangement provides greater support for the cutting inserts than prior art arrangements in which the elongated slot extends to one or both of the end walls of the broach holder.

The number of cutting inserts 16 contained within the slot 14 is limited only by the length of the slot 14 and the width of the cutting inserts 16. As shown in FIG. 1 six cutting inserts are aligned within the slot 14. Because the slot 14 shown in FIG. 1 is long enough to accomodate more than six cutting inserts 16, a spacer bar 26 is provided to occupy the remaining length of the slot 14 and to maintain pressure on the cutting inserts 16 along the longitudinal axis A—A of the slot 14.

The spacer bar 26 is forced against the foremost cutting insert 16A by a clamp 28 as explained hereinafter. Pressure exerted by the spacer bar 26 causes the hindmost cutting insert 16B to press against a block 30 to thereby secure the cutting inserts 16 longitudinally along the axis A—A within the elongated slot 14. The block 30 is braced against the end wall 22 of the slot 14 and thereby prevents the cutting inserts 16 from moving out of alignment. This prevents the cutting inserts 16 from fracturing and/or from wearing unevenly. The shape of the block 30 can vary. It may be provided whith an elevated spine 31 having an end 29 which is flush against the rear most cutting insert 16B to brace the cutting inserts 16 against the forces generated along axis A—A.

Positioned along the elongated slot 14 are a plurality of semicircular wedges 32 housed within corresponding semicircular slots 33. As shown best in FIGS. 3A and 3B, the semicircular wedges 32 include an arcuate rear wall 34 and a pair of spaced-apart forward faces 36a and 36b. Each of the faces 36a and 36b is adapted to engage a corresponding face of a separate cutting insert 16 as described hereinafter. The faces 36a and 36b have an inward angle of taper θ, preferably up to about 10°, most preferably up to about 7°. The faces 36a and 36b are separated by an indentation 38 to enable each of the faces 36a and 36b to separately engage adjacent cutting inserts 16.

Each wedge 32 is provided with an axial hole 40. A screw or bolt, preferably a compound screw, is insertable into the axial hole 40 so that the wedge 32 can pivot about its axis to enable faces 36a and 36b to engage the corresponding faces of adjacent cutting inserts 16 in full face to face contact.

As shown best in FIG. 4, the wedge 32 is contained within a semicircular slot 33 having an arcuate rear wall 50. The slot 33 has an axial hole 52 therein alignable with the axial hole 40 of the wedge 32.

A compound screw 46 which is insertable into the axial hole 40, includes a head section 54 and a tail section 56 provided with opposed running threads/grooves. For example, the head section 54 is provided with left hand threads and the tail section 56 with right hand threads and the respective axial holes 40 and 52 provided with complimentary grooves. Both the head and tail sections 54 and 56 are provided with a slot (not shown) for receiving an appropriate drive means such as a screw driver or hex wrench. Accordingly, as the compound screw 46 is driven downward into the axial holes 40 and 52, the wedge 32 is drawn into the slot 33 to thereby cause the forward face 36 of the wedge 32 to exert pressure against the corresponding face 58 of the cutting insert 16 and press the insert against the side wall 17b of the slot 14.

To insure wedging engagement the cutting insert face 58 should be tapered at an acute angle with respect to the base 59 of the cutting insert 16. The wedge face 36 and the cutting insert face 58 preferably have the same degree of taper. As a result the cutting insert 16 is locked within the elongated 14 along the axis B—B shown in FIG. 1.

As previously described in connection with FIG. 1, less than a full compliment of cutting inserts 16 may be secured within the elongated slot 14. To insure proper alignment of the cutting inserts 16 and to prevent fracture and uneven wear, the cutting inserts 16 are maintained in position by the combination of a clamp 28 and spacer bar 26 at one end of the slot 14 and a thrust block 30 at the opposed end.

Figure 5:
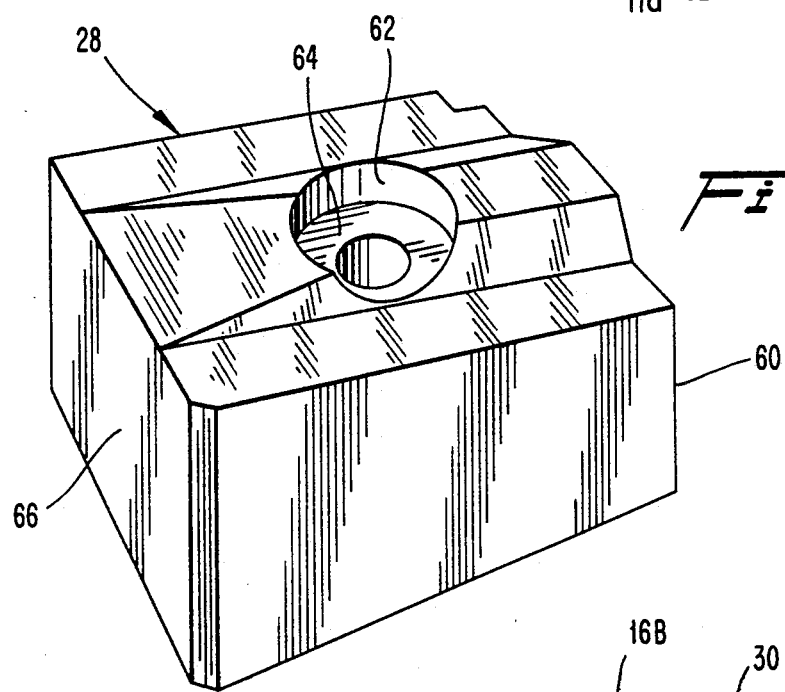
FIG. 5 is a perspective view of the clamp used to secure the cutting inserts longitudinally within the broach holder.
Figure 6:
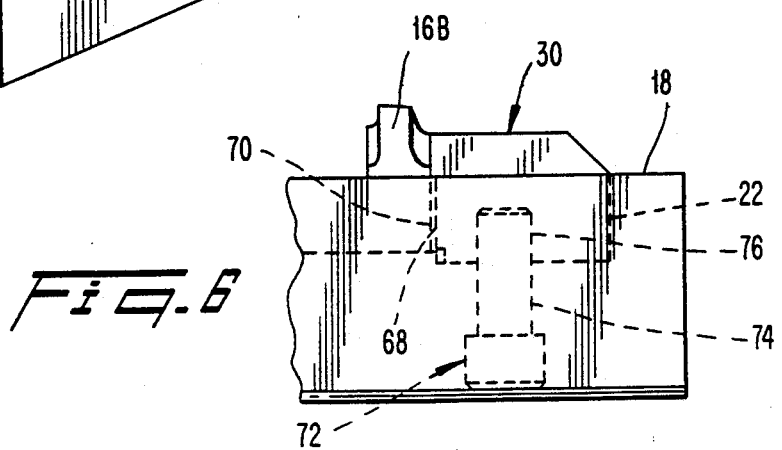
FIG. 6 is an perspective view of a thrust block positioning and securing the cutting inserts within the broach holder.
Figure 7:
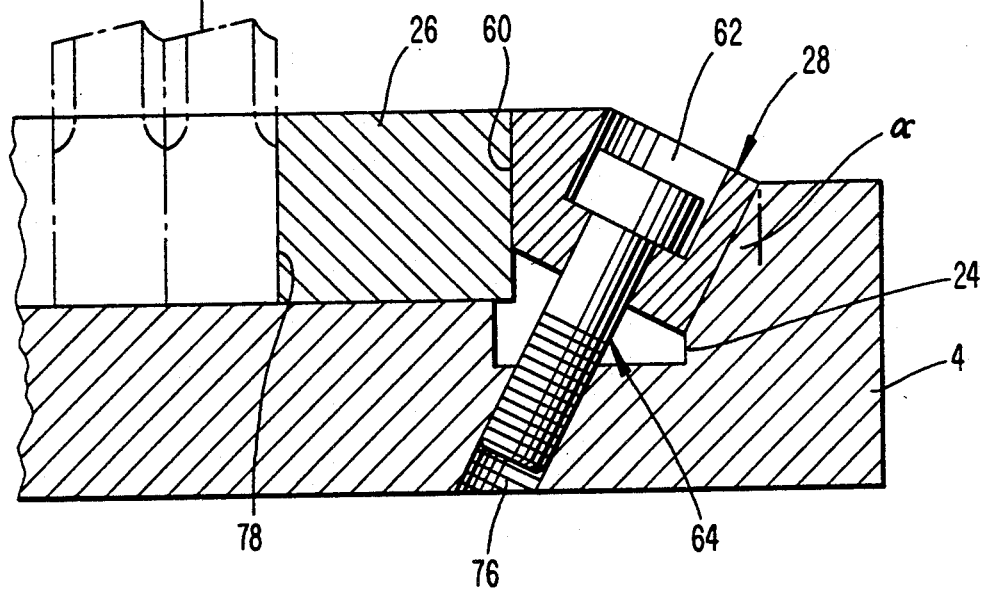
FIG. 7 is a cross-sectional view taken along line 6—6 of FIG. 1.

Referring to FIGS. 5-7, there is shown a clamp 28 having a face 60 positioned to abut against the spacer bar 26 (shown in FIG. 1) or the foremost cutting insert 16A if a full compliment of cutting inserts 16 are employed in the slot 14. The clamp 28 has an axial hole 62 therethrough and is secured against the end wall 24 of the slot 14 by a screw 64 extending through the axial hole 62 of the clamp 28 into the body of the broach holder 4. The clamp 28 is adapted to exert a force along the axis A—A against the spacer bar 26. This may be accomplished by providing either of the faces 60 or 66 of the clamp 28 with a taper sufficient to urge the clamp against the spacer bar 26 or the foremost cutting insert 16A as best shown in FIG. 7. The angle of taper α is in the range of up to 10°, preferably up to 7°.

Referring to FIG. 6, the thrust block 30 is secured against the end wall 22 of the elongated slot 14. The thrust block 30 has a face 68 which abuts against a corresponding face 70 of the rearmost cutting insert 16B. The thrust block 30 is secured within the body of the broach holder 4 by a screw 72 inserted through an axial hole 74 in the broach holder 4 and a corresponding axial hole 76 in the thrust block 30.

Figure 8:
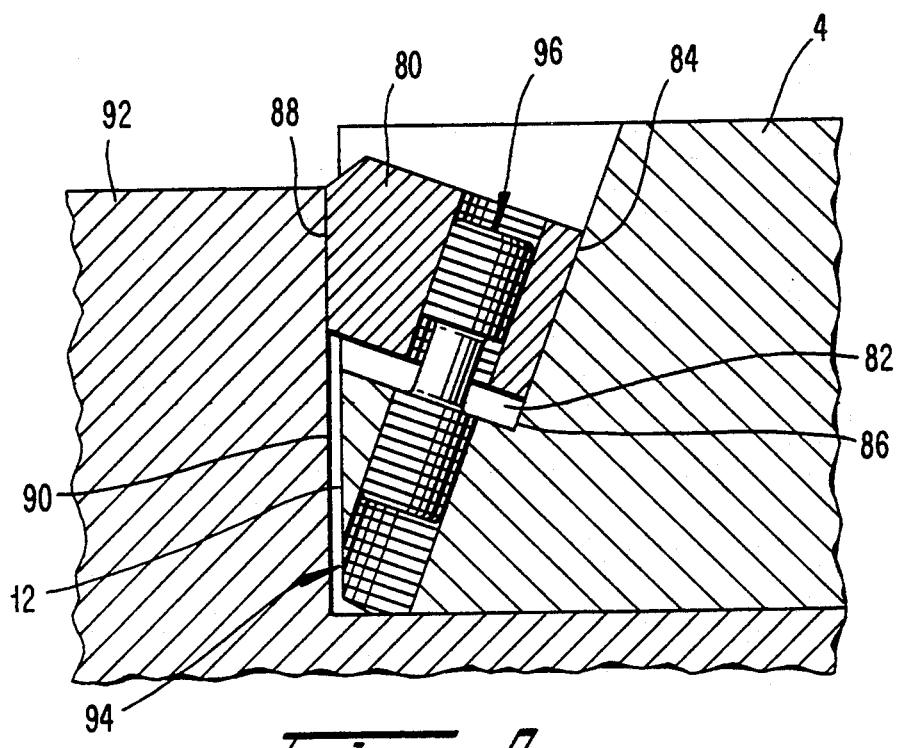
FIG. 8 is a cross-sectional view taken along line 7—7 of FIG. 1.

The broach holder 4 is secured laterally within the broaching machine by a plurality of spaced apart semicircular wedges 80. Referring to FIGS. 1, 2 and 8, the wedges 80 may be similar to the wedges 32 described previously in connection with FIGS. 3A and 3B. The wedges 80 are secured within semicircular slots 82 which intersect the external side wall 12. A rearward face 84 of the wedge 80 abuts against a corresponding wall 86 of the slot 82.

The wedges 80 have a forward abutment face 88 which is disposed outside of the external side wall 12 and abuts against a corresponding wall 90 of a broaching machine 92 creating a wedging engagement between the wedge 80 and the broaching machine 92 in the direction of the line B—B to thereby lock the broach holder 4 therein. A gap 94 as shown in FIG. 8 provides the clearance necessary for the wedge 80 to be drawn downward within the slot 82 and yet allow the wedge to be easily disengaged from the locked position when it is necessary to remove the broach holder 4 from the broaching machine 92. A compound screw 96 of the type described in connection with FIG. 4 may be used for moving the wedge 80 into and out of locking engagement with the broaching machine 92.

It is also desirable to secure the broach holder 4 to the broaching machine along the axis C—C shown in FIGS. 1 and 2. Referring to FIG. 1, there is provided an elongated cavity 100 positioned at opposed ends of the broach holder 4. Each cavity 100 includes a wall 102 and a base 104. Within the base 104 is a slot 106 of sufficient diameter to receive a screw 108 therein.

The screw 108 includes a tail section 110 which is insertable into the slot 106 which extends through the broach holder 4 so that the screw can enter a corresponding hole (not shown) of the broaching machine. The screw 108 also includes a head section 112. The underside 113 of the head section 112 rests on the base 104 of the cavity 100. The top surface 114 of the screw 108 is no higher than the upper surface 116 of the holder 4 when the screw 108 is secured within the slot 106. In operation, the tail section 110 of the screw 108 is moved to the desired location within the slot 106 and the screw 108 is driven into the slot 106 until the underside 113 of the head section 112 rests on the base 104 of the cavity 100 and the broach holder 4 is secured to the broaching machine.

An alternate assembly is shown in FIG. 2. The broach holder 4 is provided with spaced apart axial holes 120 which extend through the broach holder 4. A screw 108 is inserted into each axial hole 120 and is of sufficient length to extend through the broach holder 4 into a corresponding hole of the broaching machine (not shown).

Each axial hole 120 is positioned with a cavity 122 having an arcuate rear wall 124 complimentary in shape to the head 112 of the screw 108. The screw 108 is driven into the axial hole 120 until it passes therethrough and into the corresponding hole of the broaching machine. The screw 108 rests directly on the base 126 of the cavity 122 or on a washer 128 placed on the base 126 surrounding the axial hole 120.

We claim:
1. A broach assembly comprising:
(a) a holder comprising a longitudinally elongated slot for housing longitudinally spaced cutting inserts aligned in a row in the slot, the slot defined by opposing longitudinally extending first and second side walls;
(b) at least one semi-circular slot positioned along the elongated slot and having a common opening therewith in the first side wall;
(c) at least one wedge means for clamping a pair of the inserts against the second side wall, the wedge means being insertable into the semi-circular slot such that an axis of the wedge means is aligned with an axis of the semi-circular slot, the wedge means comprising a pair of longitudinally spaced apart cutting insert engaging faces and being adapted to pivot about its axis within the semi-circular slot until each cutting insert engaging face of the wedge means is in flush engagement with a corresponding face of a corresponding cutting insert; and
(d) fastener means for releasably locking the wedge means to the holder in flush engagement against the pair of cutting inserts to push the pair of inserts against the second side wall and thereby secure the pair of cutting inserts within the elongated slot of the holder.

2. The broach assembly of claim 1, wherein the cutting insert engaging faces of the wedge means having an angle of taper of up to 10°.

3. The broach assembly of claim 1, wherein the cutting insert engaging faces of the wedge means have an angle of taper of up to 7°.

4. The broach assembly of claim 1, wherein said fastener means comprises a screw, the wedge means comprising an axial hole adapted to receive said screw, said holder having a corresponding axial hole for receiving said screw wherein when the screw is rotated the wedge means is drawn into the semicircular slot to thereby wedgingly engage the pair of cutting inserts.

5. The broach assembly of claim 1 further comprising a spacer bar positioned in the elongated slot and extending from a longitudinally leading cutting insert to the clamping means, said clamping means adapted to exert pressure against the spacer bar and thereby exert a corresponding pressure against the cutting inserts.

6. The broach assembly of claim 1 further comprising securing means for securing the holder to a broaching machine comprising at least two spaced apart cavities having an axial hole therein extending through the holder, screw means insertable into the axial holes and of sufficient length to extend out of the axial holes for engaging a corresponding hole of a broaching machine.

7. The broach assembly of claim 6, wherein the securing means comprises end cavities having elongaged slots therein, said screw means being movable in the slot along the longitudinal axis of the holder.

8. The broach assembly of claim 1, wherein the elongated slot is contained entirely within the holder.

9. The broach assembly of claim 1 including a block positioned in said slot between the inserts and a rear wall of the slot to resist rearward longitudinal loading applied to the inserts during a machining operation.

10. The broach assembly of claim 9 including clamping means disposed in said slot between the inserts and a front wall of the slot for exerting rearward longitudinal pressure against the inserts to thereby secure the inserts longitudinally within the slot.

11. The broach assembly of claim 1, wherein said holder is adapted to be mounted in a broaching machine, said holder including an external side wall and a plurality of additional slots formed in said holder so as to intersect said external side wall, a plurality of additional wedges insertable into said additional slots such that an abutment surface of each of said wedges is situated outside of said external side wall, and additional fastener means for releasably locking said additional wedge means to said holder whereby said abutment surface engages a wall of the broaching machine to wedgingly secure said holder in said broaching machine.

12. The broach assembly of claim 11, wherein said additional slots are of semi-circular shape.

13. A broach assembly comprising:
  (a) a holder comprising a longitudinally elongated slot for housing longitudinally spaced cutting inserts aligned in a row in the slot, the slot defined by opposing longitudinally extending first and second side walls;
  (b) at least one semi-circular slot positioned along the elongated slot and having a common opening therewith in the first side wall;
  (c) at least one wedge means insertable into the semi-circular slot such that an axis of the wedge means is aligned with an axis of the semi-circular slot, the wedge means comprising a cutting insert engaging face and being adapted to pivot about its axis within the semi-circular slot until the cutting insert engaging face of the wedge means is in flush engagement with a corresponding face of a cutting insert; and
  (d) fastener means for releasably locking the wedge means to said holder in flush engagement against the face of the cutting insert to push the insert against the second side wall and thereby secure the cutting insert within the elongated slot of the holder.

* * * * *